June 26, 1962     J. V. VOGEL     3,040,576
PRESSURE-OPERATED METERING APPARATUS
Filed July 16, 1958     2 Sheets-Sheet 1

INVENTOR:
J. V. VOGEL
BY: A. H. McCarthy
HIS AGENT

June 26, 1962  J. V. VOGEL  3,040,576
PRESSURE-OPERATED METERING APPARATUS
Filed July 16, 1958  2 Sheets-Sheet 2

INVENTOR:
J. V. VOGEL
BY: J. H. McCarthy
HIS AGENT

United States Patent Office 3,040,576
Patented June 26, 1962

3,040,576
PRESSURE-OPERATED METERING APPARATUS
John V. Vogel, Kilgore, Tex., assignor to Shell Oil
Company, a corporation of Delaware
Filed July 16, 1958, Ser. No. 748,989
4 Claims. (Cl. 73—224)

The present invention relates to apparatus for metering liquids and pertains more particularly to an apparatus for accurately measuring successive volumes of liquid by what is known as the "batch" method. This invention is related to the metering apparatus described in my U.S. Patent 2,971,377 which was issued February 14, 1961.

In oil fields and other installations it is often necessary to measure the volume of a fluid being handled or produced. Since, in many oil fields, gas is often produced along with the oil from the wells, considerable error may be introduced into metering measurements if a positive displacement meter is employed. Therefore, it is a common practice in many installations to employ a metering tank in which a predetermined volume of liquid is metered between two levels.

In general, the apparatus employed for metering in a tank comprises a tank with liquid level sensing devices installed near the top and the bottom of the tank. The liquid level sensing devices are connected through a suitable control circuit to actuate valves in the inlet and outlet lines of the tank whereby the tank is repeatedly filled and emptied between the upper and lower level indicating devices.

A primary object of the present invention is to provide an apparatus for accurately measuring or metering repeatedly a predetermined constant volume of fluid which is subsequently delivered under pressure to a pipeline or to storage tanks.

A further object of the present invention is to provide a simplified apparatus having a minimum of component parts for automatically and repeatedly measuring predetermined volume of a liquid.

Due to the turbulent motion of the fluid level in a rapidly filling or emptying vessel equipped with upper and lower float switches, the level at which a float switch is actuated may vary as much as one inch. This inconsistency results in an appreciable volume error across the area of the vessel. It is, therefore, an additional object of this invention to provide means for accurately measuring the upper and lower liquid levels of a constant volume chamber so that any error caused by the liquid level sensing device would be negligible as compared with the volume of the fluid metered in the constant volume chamber.

These and other objects of this invention will be understood from the following description taken with reference to the drawing, wherein.

Figure 1:
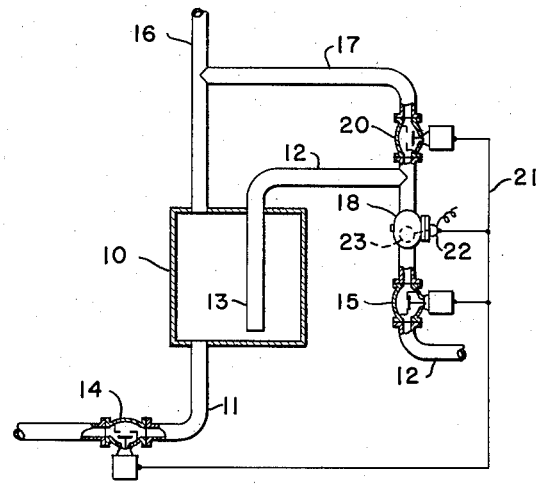
FIGURE 1 is a schematic view illustrating the component parts of the present system when the volume chamber of the system is being filled.

Referring to FIGURE 1 of the drawing, the metering apparatus of the present invention comprises a closed tank 10 having an inlet conduit 11 in communication therewith. A discharge conduit 12 having a standpipe 13, extends through the top of the tank to a level near the bottom thereof. Control valves 14 and 15 are positioned in the inlet and outlet lines 11 and 12, thus becoming the inlet and outlet valves. The tank 10 is provided with a gas inlet line 16 extending into the top thereof through which gases may be introduced under pressure in order to force liquid from the tank during the emptying operation. If desired, the tank outlet line 12 may extend from the bottom of the tank or, in certain installations, it may extend through the side wall of the tank.

The tank 10 is provided with a gas equalizing by-pass line 17 which is in communication between the gas inlet line 16 and the liquid discharge line 12 at a point upstream of the outlet valve 15. A liquid-level sensing device 18, or any type well known to the field of control instruments, is installed in preferably a vertical portion of the discharge line 12 which becomes the fluid inlet line into the liquid-level sensing device 18. The liquid-level sensing device 18 is located in the discharge line 12, or in a by-pass loop thereof, upstream of the outlet valve 15. The gas equalizing conduit 17 is provided with a valve 20 for controlling the fluid flow therethrough.

Valve 20 serves as a pressure-equalizing valve between conduits 12 and 16 and the liquid-level sensing device 18 to equalize the pressure in the system when the tank 10 is being filled. During the tank draining operation, the equalizing valve 20 is closed thereby permitting the gas pressure from conduit 16 to force the liquid from tank 10. The equalizing valve 20 is shown as being a power-actuated valve but in its simplest form may be merely a check valve or any uni-directional valve 20a (FIGURE 3) which permits flow of gas from conduits 12 and 13 into conduit 17 when the tank 10 is being filled.

The inlet and outlet valves 14 and 15, respectively, are shown as power-actuated valves, for purposes of illustration. The power supplied to the valves 14 and 15, and if desired to valve 20, is supplied through a suitable power transmission line 21. A pilot 22, such as a valve or switch, is fixedly secured to and actuated by the float 23 in the liquid level sensing device 18. This pilot 22 governs the flow of power or of a power fluid to the valves to actuate them in one direction or the other, as the float 23 raises and lowers and thus opens and closes pilot 22.

Although valves 14, 15 and 20 are illustrated as electrically-actuated valves, they may be also actuated pneumatically, mechanically or hydraulically in a manner well known to the art. Thus, for example, when valves 14, 15 and 20 are of the solenoid type, an electric switch, preferably of the mercury type, would be employed as the pilot 22 and the power transmission leads 21 would be in the form of electrical conductors for leading currents to operate the valves. On the other hand, if valves 14, 15 and 20 are of the air-actuated diaphragm type, the pilot 22 would be in the form of a pilot valve while the power transmission lines 21 would be in the form of hydraulic tubing leading an air supply to the valves to operate them. As mentioned above, valve 20 could be a check valve so that the pilot 22 would be only employed to control the inlet and outlet valves 14 and 15.

Any suitable type of liquid-level sensing device 18 may be employed. For example, float operated liquid-level controllers, floatless liquid-level controllers, float switches, probe-type electric liquid-level controllers, differential pressure switches, etc. may be employed to actuate a pilot valve or electric switch at 22. Since all of these types of liquid-level sensing devices are well known to the art and since their particular construction and operation does not form part of this invention, they will not be further described here.

As illustrated in FIGURE 1, the upper liquid level in the present apparatus is determined by the highest level at which the discharge line 12 communicates with the liquid-level sensing device 18, while the lower liquid level is determined by the position of the lower end of the standpipe 13. It is essential that the liquid-level sensing device 18 be positioned in the discharge line 12 above the outlet valve 15 so that the volume of fluid, whose liquid level is being measured, is confined in a chamber that is considerably smaller in diameter than that of the tank 10, thus providing a more accurate cutoff of the measured volume. Preferably, the liquid level sensing device 18 is positioned in a vertical portion of conduit 22 to achieve greater accuracy of measurement. With the apparatus shown in FIGURE 1, the portion of tank 10 between the bottom of the standpipe 13 and the top of the tank, and the volume of the standpipe, define a chamber of constant volume. This volume of fluid is meter each time that the apparatus is filled and emptied.

Figure 2:
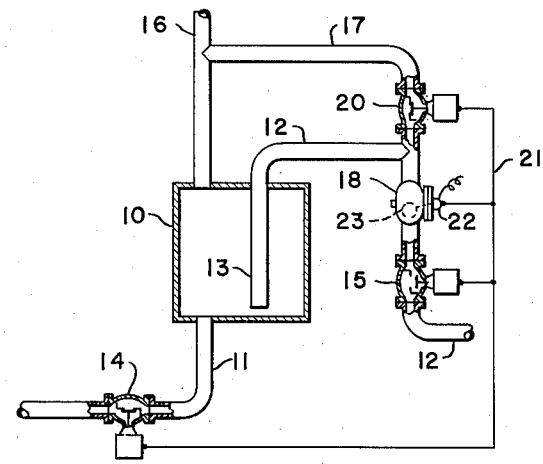
FIGURE 2 is a schematic view illustrating the equipment of FIGURE 1 when the system is being drained.

In the meter filling operation as illustrated in FIGURE 1, the inlet valve 14 and the gas-equalizing valve 20 are open while the outlet valve 15 is closed. Fluid from any desired source flows up inlet conduit 11, filling tank 10 against gas pressure that is constantly being supplied at all times through conduit 16. The filling continues until the liquid passes out standpipe 13 and conduit 12, overflowing into the liquid-level sensing device 18. In the event that the portion of conduit 12 between the liquid-level sensing device 18 and the valve 15 is empty, which is not the normal case, liquid would fill this portion of the conduit 12. Then, as the liquid rose in the housing of the liquid-level sensing device 18, the pilot 22 would be actuated to close valves 14 and 20 while simultaneously opening valve 15, unless valve 20 is a check valve. With the outlet valve 15 opened, liquid drains from the tank 10 through the sensing device 18 due to the higher pressure gas entering from conduit 16 into tank 10 and driving fluid out the lower pressure outlet line 12. When the level in the tank has reached the bottom of the standpipe 13, gas from conduit 16 enters the standpipe 13 and discharge line 12 and thence into the liquid-level sensing device 18. As the liquid level in the sensing device 18 drops, the float 23 falls actuating the pilot 22 to return it to its previous position in which valves 14 and 20 are opened and valve 16 is closed. FIGURE 1 illustrates the position of the valve during the filling cycle while FIGURE 2 illustrates the position of the valves during the emptying cycle.

Measuring accuracy is achieved in the present metering apparatus due to the fact that the upper liquid level is weir controlled, while the lower liquid level is controlled in a portion of the constant volume chamber having a reduced cross-section. Accuracy of measurement at the upper and lower level depends on the speed of the controls and the size of the conduit 12.

Figure 3:
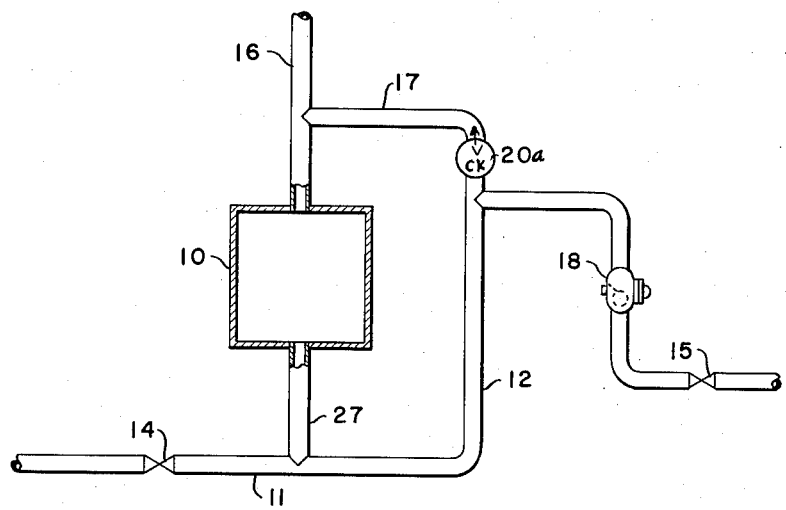

A modification of the present metering apparatus is shown in FIGURE 3 which may be preferred when it is desired to employ the entire capacity of the tank 10 as part of the constant volume chamber. In this form of the apparatus a conduit 27, extending from the bottom of the tank 10 and connecting with the inlet line 11 and the outlet line 12, forms a common inlet and outlet line depending on whether the tank is being filled or emptied. Additionally, in order to fill the tank 10 entirely, it is necessary that a portion of the outlet conduit 12 rise to a level above the top of the tank before the liquid-level sensing device is installed therein. In this form of the apparatus, the liquid chamber of constant volume is formed by the tank 10, conduit 27, and portions of conduit 16 and 12 up to the highest level of conduit 12. During the filling cycles of this metering apparatus, with valves 14 and 20 open and valve 15 is closed, fluid flows in lines 11 and 27 to fill tank 10 while liquid is simultaneously rising at the same level in conduit 12. After the tank 10 is filled liquid starts to rise in conduit 16 and rises ot the highest level of the outlet line 12 at which time fluid in the outlet line 12 spills over into the liquid-level sensing device causing the float therein to actuate the pilot 22, as described with regard to FIGURE 1, thus closing valves 14 and 20 while simultaneously opening valve 15.

Figure 4:
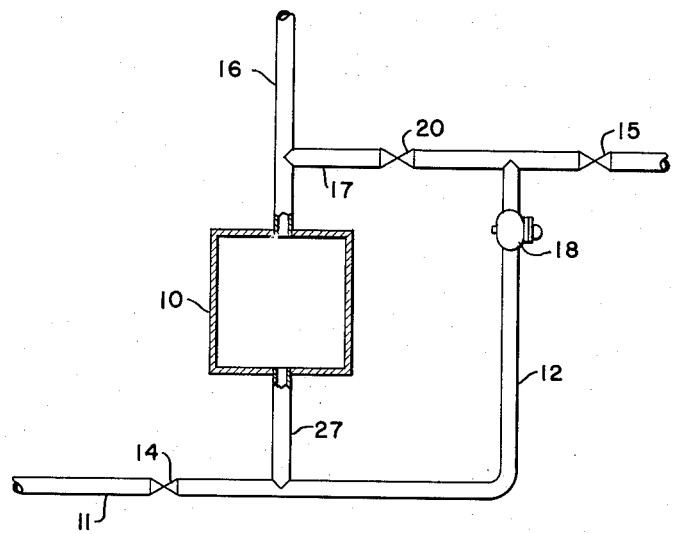
FIGURES 3 and 4 are schematic views illustrating alternative arrangements of equipment of the system of the present invention.

A further arrangement of the present apparatus is shown in FIGURE 4 wherein the liquid-level sensing device 18 is positioned in the tank outlet line 12 at a level above the top of the tank 10. Thus, in the operation of this arrangement, with valves 14 and 20 open while valve 15 is closed, the liquid level rises in conduit 27 and tank 10 while simultaneously rising in conduit 12. At the time the liquid level in conduit 12 rises into the liquid-level sensing device 18 to actuate it, tank 10 has been filled and liquid has started to rise in the gas conduit 16. Upon actuation of the liquid-level sensing device 18, the setting of the valves are altered so that valves 14 and 20 are closed while valve 15 is opened. Gas pressure from conduit 16 then empties the metering apparatus by forcing the liquid out of tank 10 through common conduit 27 and up outlet line 12 through valve 15. When the gas breaks through to the liquid-level sensing device 18, the valves are actuated to their original position, as previously described.

I claim as my invention:

1. Apparatus for metering a constant volume of liquid which comprises a closed tank, inlet conduit means to said tank, outlet conduit means from said tank, at least a portion of said outlet conduit means being above the top of said tank, gas inlet conduit means open at all times into the top of said tank, a single liquid-level sensing device positioned in said tank outlet conduit means, said tank outlet conduit means having a substantially vertical portion at the level of said liquid-level sensing device, gas by-pass conduit means in communication between said gas inlet conduit means and said tank outlet conduit means at a point above said level sensing means, valve means in said inlet and outlet conduit means from said tank, said valve means being operatively connected to said sensing means for opening one of said conduit means at a time, and pressure-equalizing valve means in said gas by-pass conduit means for closing said by-pass conduit means when liquid is being drained from said tank.

2. Apparatus for metering a constant volume of liquid which comprises a closed tank, inlet conduit means to said tank, outlet conduit means from said tank, at least a portion of said tank and said conduit means defining a chamber of constant volume, at least a portion of said outlet conduit means being above the top of said tank and at the top level of said constant volume chamber, gas inlet conduit means open at all times into the top of said tank, a single liquid-level sensing device positioned in said tank outlet conduit means, said tank outlet conduit means having a substantially vertical portion at the level of said liquid-level sensing device, gas by-pass conduit means in communication between said gas inlet conduit means and said tank outlet conduit means at a point above said level sensing means, valve means in said inlet and outlet conduit means from said tank, said valve means being operatively connected to said sensing means for opening one of said conduit means at a time, and pressure-equalizing valve means in said gas by-pass conduit means for closing said by-pass conduit means when liquid is being drained from said tank.

3. Apparatus for metering a constant volume of liquid which comprises a closed tank, inlet conduit means to said tank, outlet conduit means from the bottom of said tank, at least a portion of said outlet conduit means being above the top of said tank, gas inlet conduit means open at all times into the top of said tank, a single liquid-level sensing device positioned in said tank outlet conduit means at a level above said tank, said tank outlet conduit means having a substantially vertical portion at the level of said liquid-level sensing device, gas by-pass conduit means in communication between said inlet conduit means and said tank outlet conduit means at a point above said level sensing means, valve means in said inlet and outlet conduit means from said tank, said valve means being operatively connected to said sensing means for opening one of said conduit means at a time, and unidirectional valve means in said gas by-pass conduit means for closing said by-pass conduit means when liquid is being drained from said tank.

4. Apparatus for metering a constant volume of liquid which comprises a closed tank, inlet conduit means to said tank, outlet conduit means from the top of said tank, at least a portion of said outlet conduit means being above the top of said tank, an outlet standpipe in communication with said outlet conduit means and extending downwardly into said tank to a level near the bottom thereof, gas inlet conduit means open at all times into the top of said tank for introducing into said tank a gas under pressure to force liquid therefrom on the discharge cycle of said apparatus, a single liquid-level sensing device positioned in said tank outlet conduit means, said tank outlet conduit means having a substantially vertical portion at the level of said liquid-level sensing device, gas by-pass conduit means in communication between said gas inlet conduit means and said tank outlet conduit means at a point above said level sensing means, a first power-actuated valve in said inlet conduit means, a second power-actuated valve in said outlet conduit means, power transmission means operatively connecting said first and second valves with said liquid-level sensing device, a pilot fixedly secured to said sensing device and operated thereby on change of liquid level within said sensing device, said pilot being operatively connected into said power transmission line to said valves, one of said valves being opened while the other is being closed, and pressure equalizing valve means in said gas by-pass conduit means for closing said by-pass conduit means when liquid is being drained from said tank.

References Cited in the file of this patent

UNITED STATES PATENTS

| | | |
|---|---|---|
| 2,831,350 | Banks et al. | Apr. 22, 1958 |
| 2,853,877 | Smith | Sept. 30, 1958 |

FOREIGN PATENTS

| | | |
|---|---|---|
| 289,384 | Germany | Dec. 21, 1915 |
| 947,663 | France | Jan. 17, 1949 |